United States Patent
Fowler

(10) Patent No.: US 8,248,678 B2
(45) Date of Patent: Aug. 21, 2012

(54) ESTABLISHING ONE-DIMENSIONAL TRANSFORMS

(75) Inventor: John H. Fowler, North Vancouver (CA)

(73) Assignee: Eastman Kodak Company, Rochester, NY (US)

( * ) Notice: Subject to any disclaimer, the term of this patent is extended or adjusted under 35 U.S.C. 154(b) by 944 days.

(21) Appl. No.: 12/274,579

(22) Filed: Nov. 20, 2008

(65) Prior Publication Data
US 2010/0123942 A1    May 20, 2010

(51) Int. Cl.
*G03F 3/08* (2006.01)
*H04N 1/60* (2006.01)
*G06K 9/36* (2006.01)

(52) U.S. Cl. .......... 358/523; 358/1.9; 358/518; 382/277

(58) Field of Classification Search .................. 358/1.9, 358/523, 518, 504, 501, 529, 530, 524; 382/277, 382/167, 162, 165, 164
See application file for complete search history.

(56) References Cited

U.S. PATENT DOCUMENTS

| | | | | |
|---|---|---|---|---|
| 5,710,827 A * | 1/1998 | Perumal et al. | | 382/167 |
| 5,781,206 A | 7/1998 | Edge | | |
| 6,027,201 A | 2/2000 | Edge | | |
| 6,331,899 B1 | 12/2001 | Samadani | | |
| 7,352,489 B2 * | 4/2008 | Chang | | 358/1.9 |
| 7,483,170 B2 * | 1/2009 | Haikin | | 358/1.9 |
| 7,573,611 B2 * | 8/2009 | Derhak et al. | | 358/1.9 |
| 7,839,498 B2 * | 11/2010 | Mestha et al. | | 356/303 |
| 7,986,448 B2 * | 7/2011 | Hayase | | 358/520 |
| 2002/0067848 A1 * | 6/2002 | Queiroz et al. | | 382/162 |
| 2003/0147088 A1 * | 8/2003 | Kulkarni | | 358/1.9 |
| 2005/0249403 A1 * | 11/2005 | Haikin | | 382/162 |
| 2006/0181722 A1 * | 8/2006 | Edge | | 358/1.9 |
| 2008/0100887 A1 * | 5/2008 | Hayase | | 358/504 |
| 2009/0147329 A1 * | 6/2009 | Chang et al. | | 358/529 |
| 2009/0180128 A1 * | 7/2009 | Fowler et al. | | 358/1.9 |
| 2009/0180685 A1 * | 7/2009 | Fowler | | 382/167 |

* cited by examiner

*Primary Examiner* — Madelein A Nguyen
(74) *Attorney, Agent, or Firm* — Nelson Adrian Blish

(57) ABSTRACT

One-dimensional color transforms are automatically calculated by identifying at least one device-independent color space curve, at least one device-dependent color space curve and at least one association amongst the curves. Depending on the motivation for creating the one-dimensional transform, different curves, associations and calculations can be used to generate the transforms without obtaining additional device measurements or iteratively adjusting transform values.

14 Claims, 12 Drawing Sheets

US 8,248,678 B2

ESTABLISHING ONE-DIMENSIONAL TRANSFORMS

CROSS REFERENCE TO RELATED APPLICATIONS

Reference is made to commonly-assigned U.S. patent application Ser. No. 12/014,821 (now U.S. Publication No. 2009/0180128), filed Jan. 16, 2008, entitled SIMPLIFIED COLOR WORKFLOW, by Fowler et al., the disclosure of which is incorporated herein.

FIELD OF THE INVENTION

The present invention pertains to establishing one-dimensional color transforms to adjust the color response of a device.

BACKGROUND OF THE INVENTION

Color transforms modify color data delivered to a reproduction device to modify a nominal response of the reproduction device. Exemplary reasons for doing so include: establishing an intended tonal response for one or more color channels, establishing an intended reproduction of selected colors, and establishing a device response that simulates or matches a different device condition.

Color transforms can be one-dimensional, as exemplified by tonal correction transforms, which transform values for a single color channel (e.g. $C_1 \rightarrow C_2$) based on a one-dimensional curve or LUT. Color transforms can also be multi-dimensional, as exemplified by color matching profiles, which transform color coordinate vectors comprising values for multiple color channels (e.g. $[C_1, M_1, Y_1, K_1] \rightarrow [C_2, M_2, Y_2, K_2]$) based on a multi-dimensional curve or LUT. In some cases, multiple sets of transforms can be successively applied for different purposes, as described in U.S. patent application Ser. No. 12/014,821.

Color transforms can be automatically generated using tools that measure or otherwise acquire information about the nominal and intended response of the reproduction device. However, these methods can be time consuming and may require the measurement of multiple reproductions produced by a device. Multi-dimensional transforms are also conceptually complex and typically require computation of a significant number of data points to yield desirable results.

One-dimensional transforms, in contrast, are conceptually simpler and computationally easier to produce but can still be time consuming to produce if reproduction measurements must be made. In addition, changes to one-dimensional transforms can affect the color response of a device so that it no longer matches an intended color response. For example, adjusting a tone reproduction curve for one color channel of a device may adversely affect the reproduction of neutral colors by the device by introducing a color cast or by changing the uniformity of a neutral color ramp.

In some situations, such as during a press run, the actual device response may appear different than intended. This may require an immediate adjustment that precludes the use of measurements to produce the desired transform. For example, a green cast may appear in the neutral color ramp (i.e. the device coordinates that are supposed to produce perceived neutral colors). As another example, reproduction of a neutral color ramp may be compressed in one region so that the perceived gradation in neutral colors reproduced is not as expected (e.g. uniform throughout the ramp).

If time is of the essence, manual creation or editing of existing transforms may be the only practical method for correcting perceived mismatches between intended and actual device response. Manual adjustment of multi-dimensional transforms is simply too complex to be reliably done. Instead, manual adjustment of one-dimensional transforms is typically the preferred method for handling such problems. Of course, there may be other situations when manual editing of one-dimensional curves is desired, when timeliness is not the prime motive but rather the problem to be resolved is most readily solved by editing one-dimensional transforms.

However, manually adjusting one or more one-dimensional transforms may affect the overall color response of the device and thus require additional iterations of adjustments to compensate. In many cases, the complexity and/or time required to achieve the ideal adjustment is too great and a compromise is made. For example, a color cast may be reduced but not entirely removed. As another example, a cast may be removed but neutral gradation uniformity is sacrificed. As another example, neutral gradation uniformity is improved but a color cast is introduced. As another example, a color cast may be reduced in one region but a different cast is introduced in another region.

Automated methods, such as those disclosed in the related application, can predict the impact to color response from changes to one-dimensional transforms. This information can be used to guide a user to iteratively make adjustments that minimize the undesirable effects of the adjustment without making reproductions. However, the number of iterations may require excessive time. Thus, a means for quickly creating and/or editing one-dimensional color transforms to effect a change in a nominal device response is required, without iterative adjustments or additional device response measurements.

As indicated above, color transforms are also useful for modifying data so that one device condition can emulate the response of another device condition. As an example, image data intended for a first device condition, characterized by a smaller gamut, can be modified for a second device condition, characterized by a wider gamut. An emulation goal can be to match color amongst reproductions made by both device conditions. In this case, multi-dimensional transforms, such as a device link, can be created.

An alternative goal can be to make the images similar but take advantage of the wider color gamut (e.g. richer saturated colors). In this case, a device link can also be created but a set of one-dimensional transforms may be preferred for a number of reasons. For example, one-dimensional transforms are easier to comprehend, easier to compute and easier to edit. As another example, one-dimensional curves are guaranteed to map the surface of one gamut to another while the use of interpolation in processing multi-dimensional transforms may cause certain portions of one gamut surface to map to the interior of the other gamut.

Prior art methods exist for device condition emulation by creating one-dimensional transforms, but these methods typically involve iteratively adjusting data used to create the transforms to minimize color errors (e.g. in the interior of the gamut) for a selection of device coordinates. Thus, a similar need exists to create one-dimensional emulation transforms, without the need for iterative adjustments or additional device response measurements.

SUMMARY OF THE INVENTION

Briefly, according to one aspect of the present invention a system and method for establishing one-dimensional transforms using a non-iterative approach based on existing device response information. In particular, these transforms are established using a computerized system. Device independent color space (DIC) curves, obtainable through device response information, are used as the basis of establishing these transforms. One-dimensional transforms for selected colors are identified by first establishing a motive for the transform and then identifying an association between at least one DIC curve and at least one device-dependent color space (DDC) curve.

According to one aspect of the invention, a nominal set of one-dimensional transforms for a reproduction device can be adjusted to compensate for an undesirable color characteristic of the device. A DIC curve can be selected as the basis of the adjustment. In one preferred embodiment, a neutral DIC curve can be selected as the basis for evaluating the color characteristic and adjusting to compensate. Although device response information predicts what device coordinates make neutral colors, the actual colors visible in a reproduction may not appear correct. A point on the DIC curve, such as one having the greatest variance from the intended color, can be selected for adjustment and an adjustment vector, specifying a change in color (e.g. lightness and/or chromaticity) for the adjustment point, can be specified. An extent of the DIC curve can be determined relative to the adjustment point to determine a range of influence for the color adjustment.

A corresponding DDC curve can be identified based on the selected DIC curve and an expected model of the device response. A set of DDC adjustment vectors can be computed based on the DIC curve's adjustment point, vector, and extent. An adjusted DDC curve can be identified and the original and adjusted DDC curves can be projected onto each DDC axis to determine one-dimensional transforms corresponding to the specified DIC color adjustment. The DDC one-dimensional transforms thus approximate the desired DIC color adjustment for a range of influence.

According to another aspect of the invention, a set of one-dimensional transforms are created so that a destination device condition can emulate a source device condition. A pair of DIC curves can be selected as the basis of the emulation. In one preferred embodiment, neutral DIC curves associated with both device conditions are selected. A set of points on the pair of DIC curves can be associated with each other. For each pair of associated DIC points, corresponding DDC points are computed and used to plot points on associated one-dimensional transforms. For example, neutral source DDC point 1 (S1) and neutral destination DDC point 1 (D1) can be associated (i.e. $[C_{S1}, M_{S1}, Y_{S1}] \leftarrow \rightarrow [C_{D1}, M_{D1}, Y_{D1}]$), so that a point plotted on the cyan one-dimensional transform identifies an output tint of $C_{D1}$ for an input tint of $C_{S1}$.

Accordingly, the basis colors produced by the destination device will be similar to those that can be produced by the source device and the variation in basis colors will appear to be uniformly spaced even though corresponding points may be calorimetrically different. When those basis colors are neutral, the neutral tone ramp produced by the destination device will appear similar to the one produced by the source device.

For special device colors, one-dimensional emulation transforms can be determined by identifying DIC curves for the tonal range of each special color in both source and destination space. One-dimensional emulation transforms can be created as above by associating a set of DIC curve points and plotting information derived from the corresponding DDC color values on the one-dimensional transform for that color.

When emulating source color by a destination device using one-dimensional transforms, all of the colors on the surface of the source gamut will map to colors on the surface of the destination gamut. Further, when the neutral DIC curves are selected as the basis of emulating chromatic process colors, neutral color ramps will appear similar. Since human perception of color difference is very acute for neutral colors, this emulation method can be a simple but effective gamut mapping method.

These and other aspects of the present invention are illustrated in the detailed description of the invention.

DETAILED DESCRIPTION OF THE INVENTION

Figure 1:
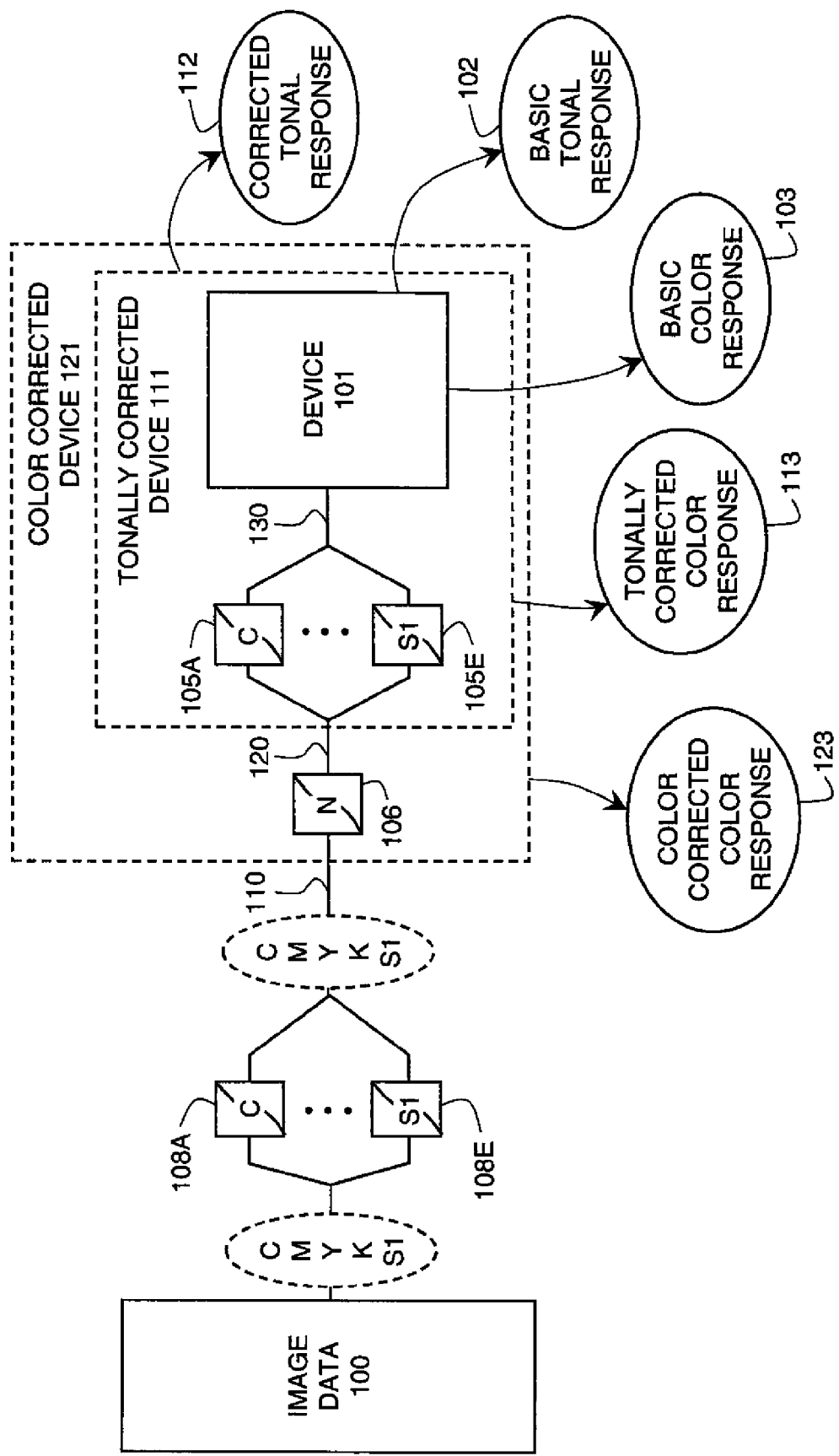
FIG. 1 is a diagram illustrating an exemplary arrangement of color transforms for a reproduction device condition according to the present invention.

FIG. 1 is a diagram illustrating an exemplary arrangement of color transforms (105A-105E, 106, and 108A-108E) for a reproduction device condition according to the present invention. Reproduction device 101 can receive image data 130 and operates to produce a reproduction of an image. Device 101 has an intrinsic device response for a specific device condition which includes a basic tonal response 102 and basic color response 103. The device response can be identified, for example, by providing known image data 130 including test patches, and measuring portions of the resulting reproduction.

A set of one-dimensional color transforms 105A-105E can be used to modify image data 120 to produce image data 130 which is then supplied to device 101 so that a corrected tonal response 112 can be achieved for tonally corrected device 111. Transforms 105A-105E can affect the device's color response which can be measured as tonally corrected color response 113.

Similarly, a multi-dimensional color transform 106 can be used to modify image data 110 to produce image data 120 so that a color corrected color response 123 can be achieved for color corrected device 121.

Another set of one-dimensional color transforms 108A-108E can be used to modify image data 100 to produce image data 110 for color corrected device 121 so that color corrected device 121 can achieve some other device response. As an example, transforms 108A-108E can be used to make color corrected device 121 emulate some other device condition.

Transforms 105A-105E, 106, and 108A-108E can be computed by one or more computer systems and utilized by the same or different computer systems to modify image data 100, 110, and 120 prior to being received by device 101. The example of FIG. 1 represents one typical example of the use of color transforms, and in particular one-dimensional color transforms (e.g. 105A-105E and 108A-108E) that are the subject of the present invention. Of course, many other configurations and uses of one-dimensional transforms are possible.

Figure 2A:
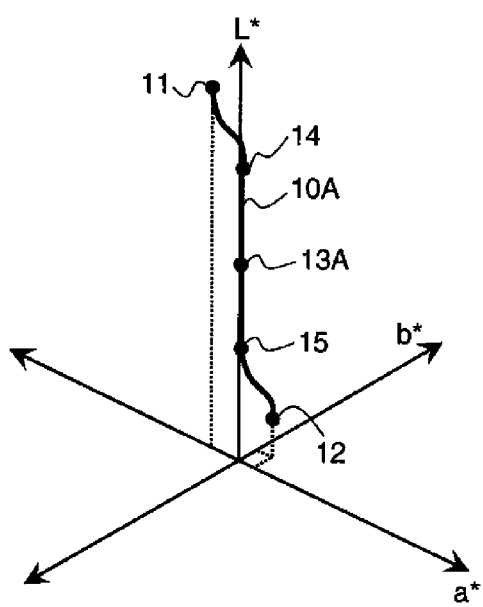
FIGS. 2A-2D are diagrams illustrating an exemplary set of DIC curves for an exemplary set of device conditions.

FIGS. 2A-2D are diagrams illustrating an exemplary set of DIC curves for an exemplary set of device conditions. FIG. 2A illustrates a neutral tone DIC curve 10A, plotted in CIELAB coordinates, for a first exemplary device condition. The device condition, for example, may represent an offset printing press operating with standard characteristics.

DIC curve 10A represents a series of points starting with an exemplary DIC light point 11 representing the color perceived when no inks have been deposited. DIC light point 11 does not lie on the neutral axis. Rather, its coordinates include a value of zero for b* and a slightly negative value for a*. This may represent a slight color cast in the printing stock.

DIC dark point 12 represents an exemplary perceived color where maximum ink deposition has occurred. Coordinates for DIC dark point 12 are also off the neutral axis and include slightly positive values for both a* and b*. This may represent a slight color cast in the combination of inks.

However, the majority of points on neutral DIC curve 10A lie near the neutral axis (e.g. quarter-tone point 14, mid-tone point 13A, and three-quarter tone point 15) and others approach the neutral axis from the DIC light point 11 and DIC dark point 12. Colors on DIC curve 10A may be generated by a particular set of DDC coordinates on a neutral DDC curve which can be established through a variety of means. One method of establishing the neutral DDC curve may be to use a reverse color model to find DDC coordinates based on a neutral DIC curve. Another exemplary method of establishing the neutral DDC curve can be to follow a particular reproduction standard (e.g. FOGRA) and to first create color transforms (e.g. 105A-105E and 106) which enable the DDC coordinates on the standard neutral DDC curve to produce near-neutral coordinates in DIC.

Figure 2B:
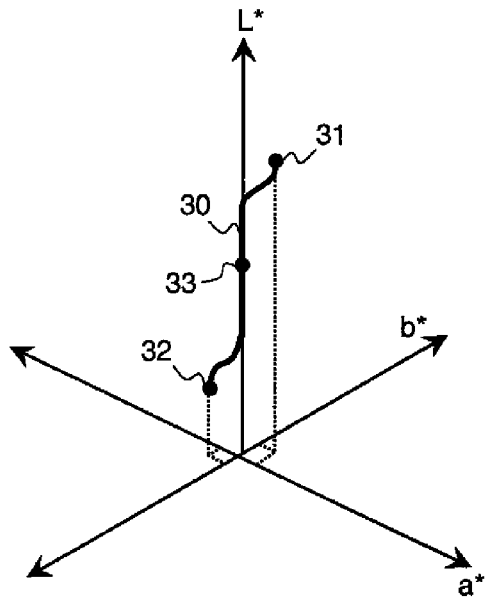

FIG. 2B illustrates a neutral tone DIC curve 30 for a second exemplary device condition. This device condition, for example, may represent a newspaper printing press operating with standard characteristics. Note that in comparison to the offset press of FIG. 2A, the newspaper press of FIG. 2B has a different neutral tone DIC curve. In particular, light point 31 has a lower L* value than DIC light point 11 and has positive values for both a* and b*. Similarly, dark point 32 has a higher L* value than DIC dark point 12 and negative values for both a* and b*. The majority of points on neutral tone DIC curve 30 lie near the neutral axis (e.g. mid-tone point 13A).

Note that many other types of DIC curves can be identified for use with the present invention. However, experience suggests that neutral tone curves may be preferable due to human sensitivity to these colors. As an example, a DIC curve representing typical flesh tones may be used. As another example, a DIC curve representing a range of colors at constant L* may be used. In general, a DIC curve representing a smooth transition of DIC colors that is important to a particular reproduction can be selected.

Figure 2C:
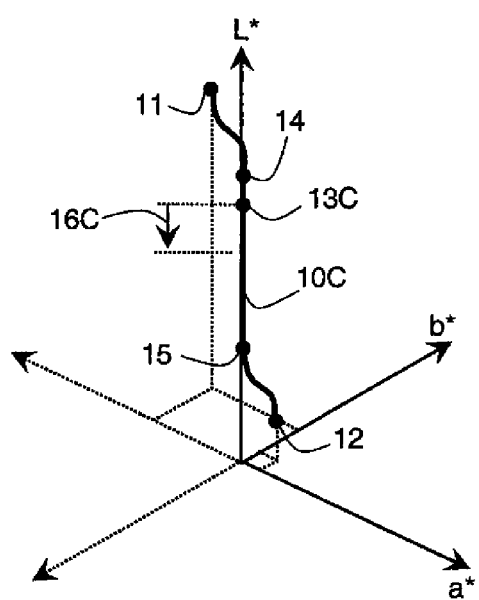
Figure 2D:
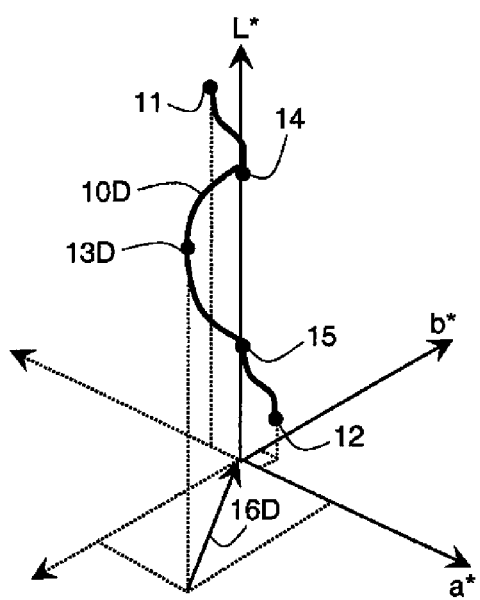

FIGS. 2C and 2D illustrate exemplary undesirable neutral DIC curves. For example, the neutral DDC curve that is supposed to correspond to neutral DIC curve 10A in fact may correspond with curves 10C or 10D instead.

If DIC curve 10C is produced, the mid-tone colors reproduced are in fact neutral but have a non-uniform distribution. For example, mid-tone point 13C is lighter than expected. In particular, mid-tone point 13C needs to be increased by lightness adjustment 16C to match mid-tone point 13A. Other mid-tone points on DIC curve 10C likely are likely also in need of adjustment so that steps in the mid-tones appear to have a non-uniform distribution. Quarter-tone neutral point 14 and three-quarter tone point 15 are depicted as being approximately correct neutral color and lightness.

If DIC curve 10D is produced, the mid-tone colors have a color cast instead of being neutral. For example, mid-tone color 13D is depicted as having a distinct color cast (e.g. positive a* and negative b* values). In addition, other mid-tone points on DIC curve 10D are depicted as also requiring adjustment.

Figure 3:
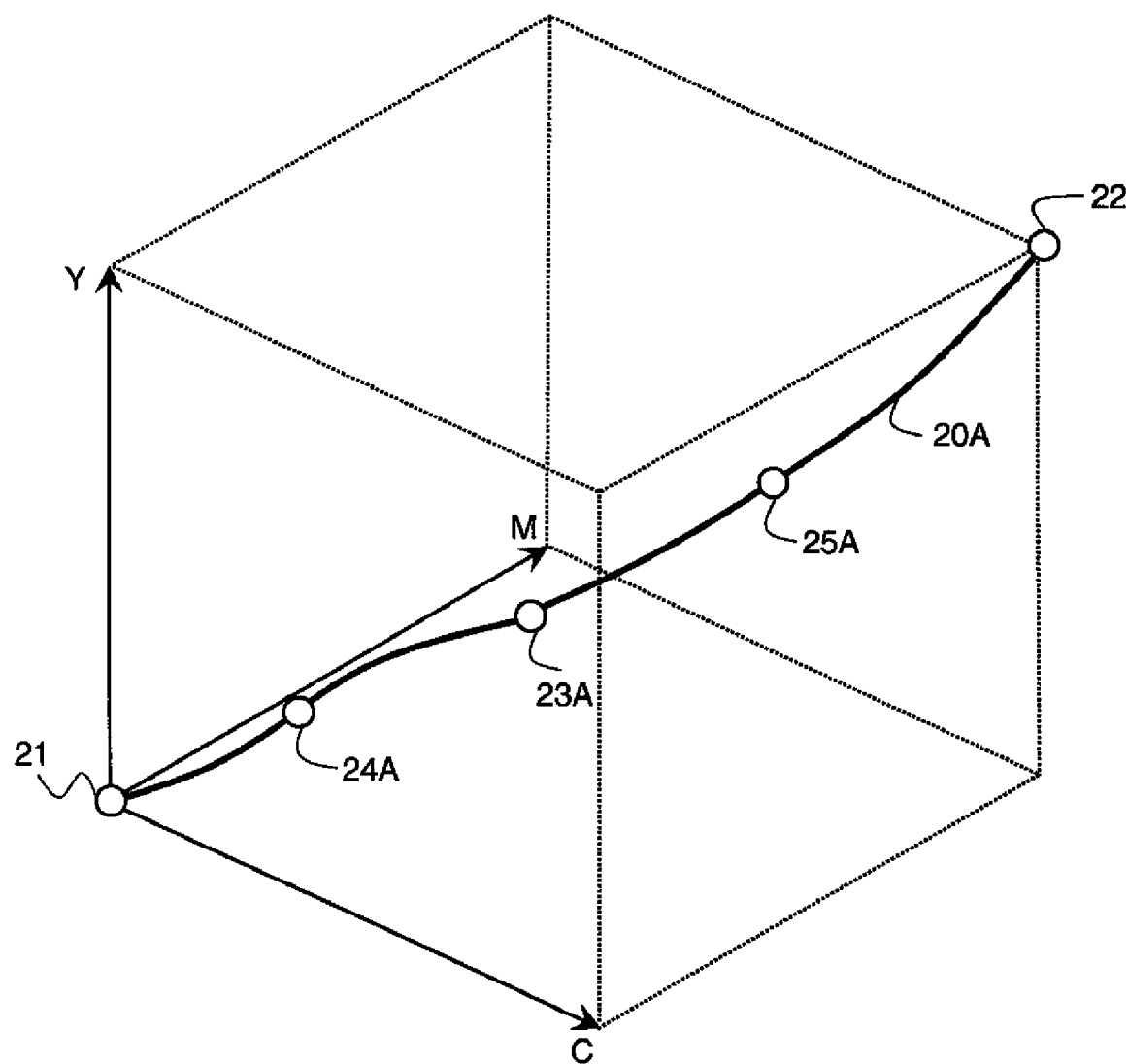
FIG. 3 is a diagram illustrating an exemplary DDC curve corresponding to DIC curve of FIG. 2A.

FIG. 3 is a diagram illustrating an exemplary DDC curve 20A corresponding to DIC curve 10A of FIG. 2A. For illustrative clarity only, the exemplary device condition includes only chromatic process colors: cyan, magenta, and yellow so that a simple DDC geometry can be drawn. For some reproduction devices, other chromatic process colors (e.g. red, green, and blue) can be used. For some devices, more than three process colors may be used. For example, black, which is achromatic, can be used. As another example, additional chromatic process colors (e.g. orange, red, and blue) can be used in some printing devices. When additional colors are used, the DDC curve traverses an N-dimensional geometry.

DDC light point 21 reproduces DIC light point 11 and represents no ink deposition. DDC dark point 22 reproduces DIC dark point 12 and represents maximum color. For some printing device conditions, especially those with additional inks, DDC dark point 22 may be governed by ink-limiting rules to be less than 100% of one or more inks. Points 23A, 24A, and 25A respectively reproduce points 13A, 14, and 15.

In other words, reproducing an image with DDC coordinates from DDC curve 20A should result in an image having colors corresponding to associated points on DIC curve 10A. The association between these points can be determined based on forward and/or reverse models derived, for example, from measuring reproduced colors. However, in some circumstances, when the nominal device response is not as expected, reproduction colors may be more consistent with curve 10C, 10D, or some other deviation from curve 10A.

Figure 4:
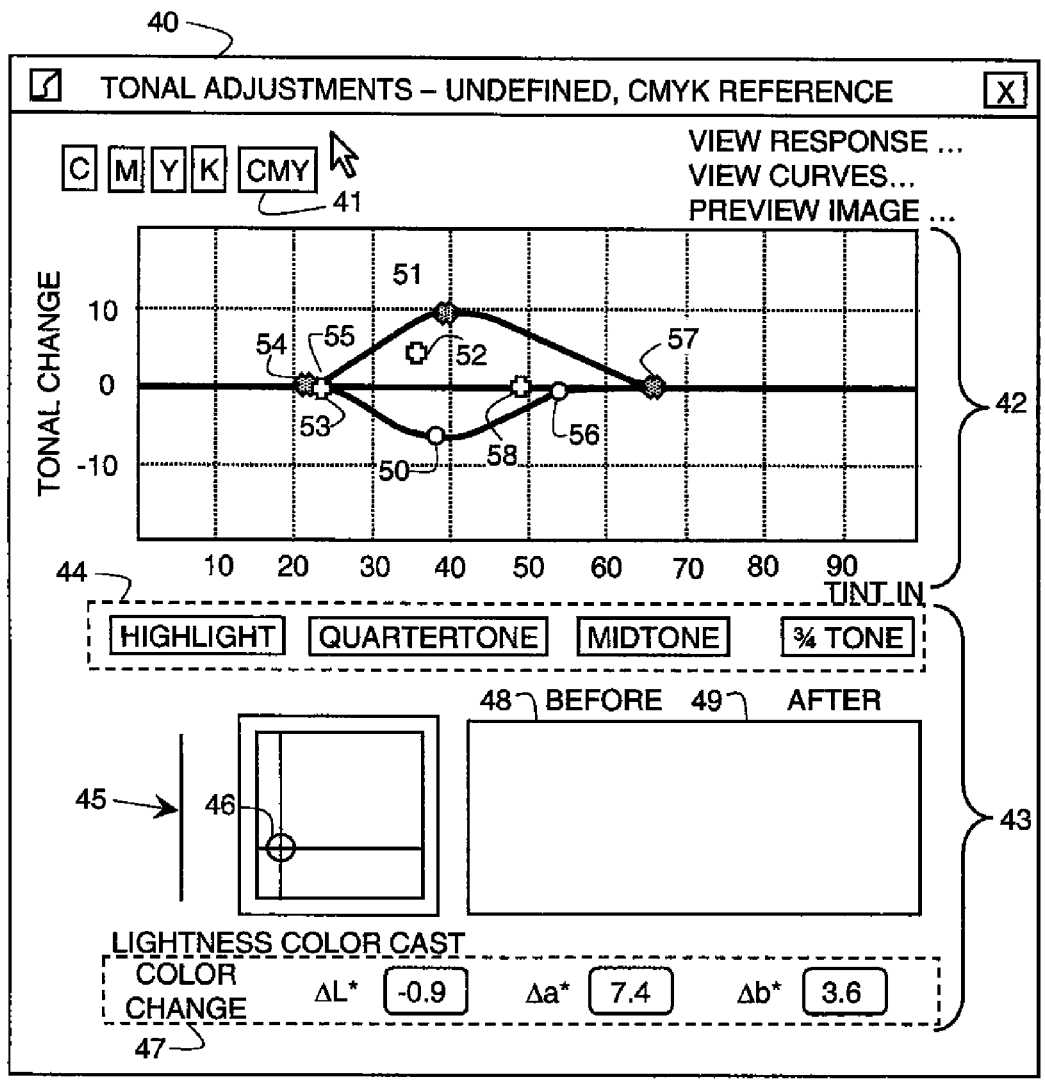
FIG. 4 is a diagram illustrating an exemplary user interface for defining a desired adjustment to a nominal device response according to the present invention.

FIG. 4 is a diagram illustrating an exemplary user interface 40 for specifying a desired adjustment to a nominal device response according to the present invention. Such an interface can be useful, for example, when a sample reproduction exists which includes nominal reproductions of a number of points from a DDC curve (e.g. DDC curve 20A).

As one alternative, such an interface may also be used without benefit of a reproduction to guide the adjustment. In this case the user simply needs a goal for modifying an expected device response. For example, the user may believe that the neutral DIC curve 10A can be achieved on a device with a particular paper stock but wants to operate the device with a new colored paper stock. If the device response for this altered device condition has not yet been calculated, the user may wish to adjust the existing device response based on his perception of the color difference in paper stocks.

User interface 40 includes a mode selector which can be used to select whether to adjust individual one-dimensional color transforms or to adjustment a set of those based on a DIC curve. Button 41, for example, is depicted as being depressed to select a mode where cyan, magenta and yellow one-dimensional color transforms are adjusted together based on DIC curve 10A. Since button 41 was pressed, areas 42 and 43 are presented. Area 42 presents the computed adjustments to one-dimensional transforms. Area 43 presents the user with controls for specifying an adjustment and visualizing the adjustment. Specifying an adjustment is described with reference to FIG. 5.

Figure 5:
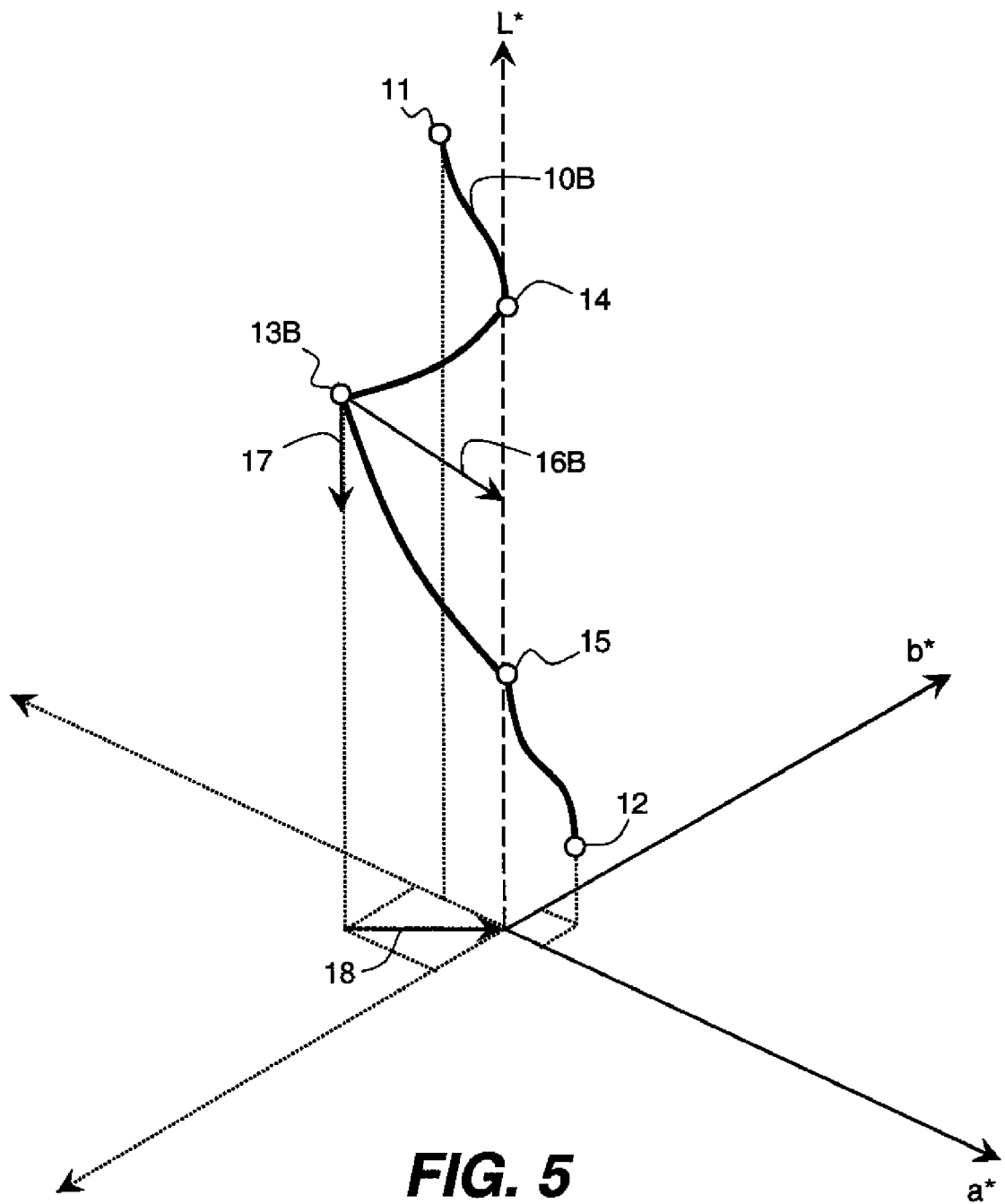
FIG. 5 is a diagram illustrating an exemplary undesirable DIC curve according to the present invention.

FIG. 5 is a diagram illustrating an exemplary undesirable neutral DIC curve 10B according to the present invention. In other words, if a sample reproduction of the coordinates on DDC curve 20A were measured, the measurements would produce DIC curve 10B. The section of DIC curve 10B between quarter tone point 14 and three-quarter tone point 15 does not include neutral colors with a uniform distribution of lightness as desired (i.e. DIC curve 10A). At a mid-tone point 13B, an adjustment 16B, comprising a lightness adjustment 17 and a color cast adjustment 18 is required to compensate (e.g. adjusts mid-tone point 13B to reach mid-tone point 13A). Note that DIC mid-tone point 13A, quarter tone point 14, and three-quarter tone point 15 correspond to DDC points 23A, 24A, and 25A of FIG. 3.

It is important to note, however, that measurements of the neutral DIC curve (e.g. 10B) likely do not exist. Rather, the expected neutral DIC curve (e.g. 10A) is what has been previously measured and/or computed for corresponding DDC curve 20A. Thus, DIC curve 10B represents what color deviations that a user perceives in a sample reproduction. As one alternative, DIC curve 10B may represent a perceived deviation from some goal that is different than the previously determined neutral DIC curve 10A.

A user can specify an adjustment by first selecting a region of DIC curve 10A using control 44. Control 44, for example, can include a set of buttons specifying adjustment regions in relation to DIC curve 10A and corresponding DDC curve 20A. FIG. 4 depicts the mid-tone button being depressed which corresponds to selection of DIC mid-tone point 13A. Mid-tone point 13A can be pre-defined or can be computed based on some characteristic of, for example, DIC curve 10A or DDC curve 20A. Mid-tone point 13A cam also be specified explicitly as one or more DDC or DIC coordinates.

In the examples of FIGS. 4 and 5, specifying an adjustment point involves implicitly specifying an adjustment extent for DIC curve 10A. The adjustment extent bounds the range of DDC coordinates that are subject to adjustment in the one-dimensional transforms. Quarter tone point 14 and three-quarter tone point 15 are implicitly selected as endpoints of the adjustment extent in this example. Various means for selecting these points can be used. As example, extent endpoints can be pre-defined in relation to mid-tone point 13A (e.g. 10 L* units darker and lighter than mid-tone point 13A). As another example, the user can dynamically specify the endpoints in terms of one or more DDC or DIC coordinates.

Desired adjustment 16B for adjustment mid-tone point 13A, can then be input by the user via controls 45-47. Visual feedback on the estimated effect of adjustment 16B at mid-tone point 13A can be presented in before patch 48 and after patch 49.

In one embodiment, after patch 49 can present the expected color corresponding to mid-tone point 13A. This appears in FIG. 4 as a neutral gray color. In the same embodiment, before patch 48 can present the color representing mid-tone point 13A with the opposite of adjustment 16B applied (i.e. point 13B). On a color monitor with reasonable color accuracy, feedback from before patch 48 may be used to assist the user in accurately operating controls 45-47 by matching the color of before patch 48 with a sample.

In another embodiment, before patch 48 can present the expected color corresponding to mid-tone point 13A while after patch 49 can present the color determined from mid-tone point 13A with adjustment 16B applied. This can be useful, for example, in adjusting color to meet a goal that is different than the expected device response.

In another embodiment, before and after patches 48 and 49 can be configured to present a relative color difference corresponding to adjustment 16B with additional controls for establishing the absolute color presented by either before patch 48 or after patch 49. This can be useful, for example, when a display providing user interface 40 is not accurately calibrated and the user is attempting to visually represent a reference color (e.g. expected, sample or desired color) in either before patch 48 or after patch 49.

Once adjustment 16B is input for mid-tone point 13A, the present invention can compute the corresponding DDC adjustment 33 to DDC point 23A by using a reverse model of the expected device response to determine the change in DDC coordinates required to produce DIC mid-tone point 13A offset by adjustment 16B. In the case where the actual device response is not as expected, the DDC adjustment will be approximate.

Next, according to one embodiment, the present invention can compute a set of implicit adjustments for other points on the adjustment extent bounded by endpoints (e.g. quarter tone point 14 and three-quarter tone point 15). A number of approaches can be used to identify the implicit adjustments. Two exemplary embodiments are discussed here in reference to FIGS. 6A and 6B.

In general, however, the present invention calculates adjusted DDC curve (e.g. 20B or 20C) and projects the difference between corresponding points on DDC curve 20B (or 20C) and DDC curve 20A on each DDC axis to identify one-dimensional adjustments for the adjustment extent.

Figure 6A:
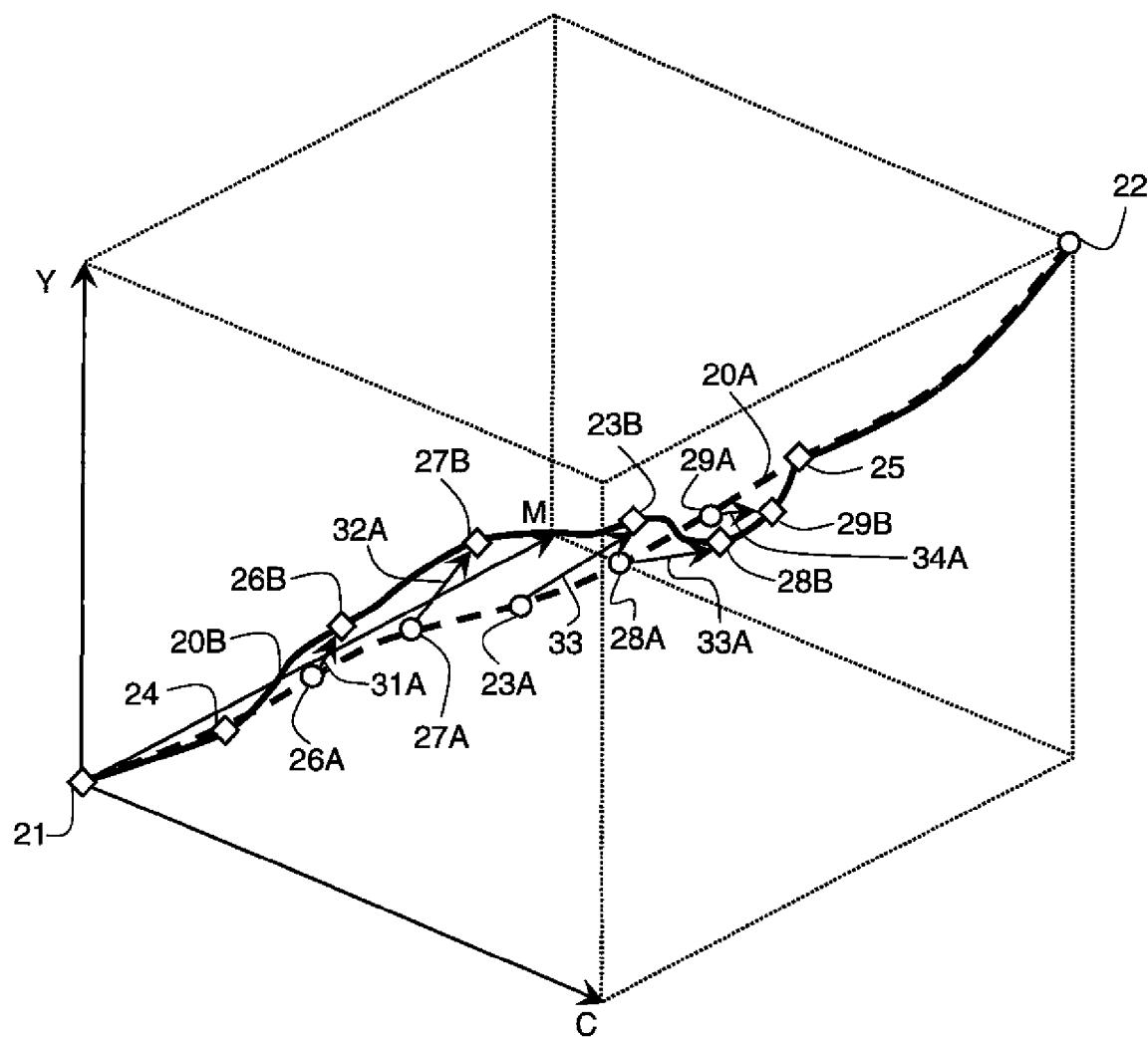
FIGS. 6A and 6B are diagrams illustrating exemplary adjustments made to a DDC curve according to the present invention.

FIG. 6A is a diagram illustrating one exemplary set of DDC adjustments 33 and 31A-34A (arrows) made to DDC curve 20A (dashed line) to produce adjusted DDC curve 20B (solid line) according to the present invention. First, a set of points on DIC curve 10A between endpoints quarter tone point 14 and three-quarter tone point 15 are selected. For example, the DIC points, not shown in FIG. 2A, but nominally produced by DDC points 26A-29A, can be selected. DIC points can be selected, for example, by finding equidistant points on curve 10A between mid-tone point 13A, quarter tone point 14, and three-quarter tone point 15.

For each selected DIC point, a DIC adjustment can be derived by maintaining the direction of adjustment 16B used for mid-tone point 13B, but reducing its magnitude to zero as it approaches quarter tone point 14 and three quarter tone point 15 along DIC curve 10A. Thus, the selected DIC points will have adjustment magnitudes that vary according to their distance from mid-tone point 13A. Then, using the device's reverse model, DDC adjustments 31A-34A can be calculated from DIC points. Note that the direction and magnitude of these DDC adjustments 33 and 31A-34A may vary, as depicted.

Adjusted DDC points 23B and 26B-29B can be calculated by adding DDC adjustments 33 and 31A-34A to DDC points 23A and 26A-29A respectively. Finally adjusted DDC curve 20B can be derived by interpolation between the DDC adjustment points.

Figure 6B:
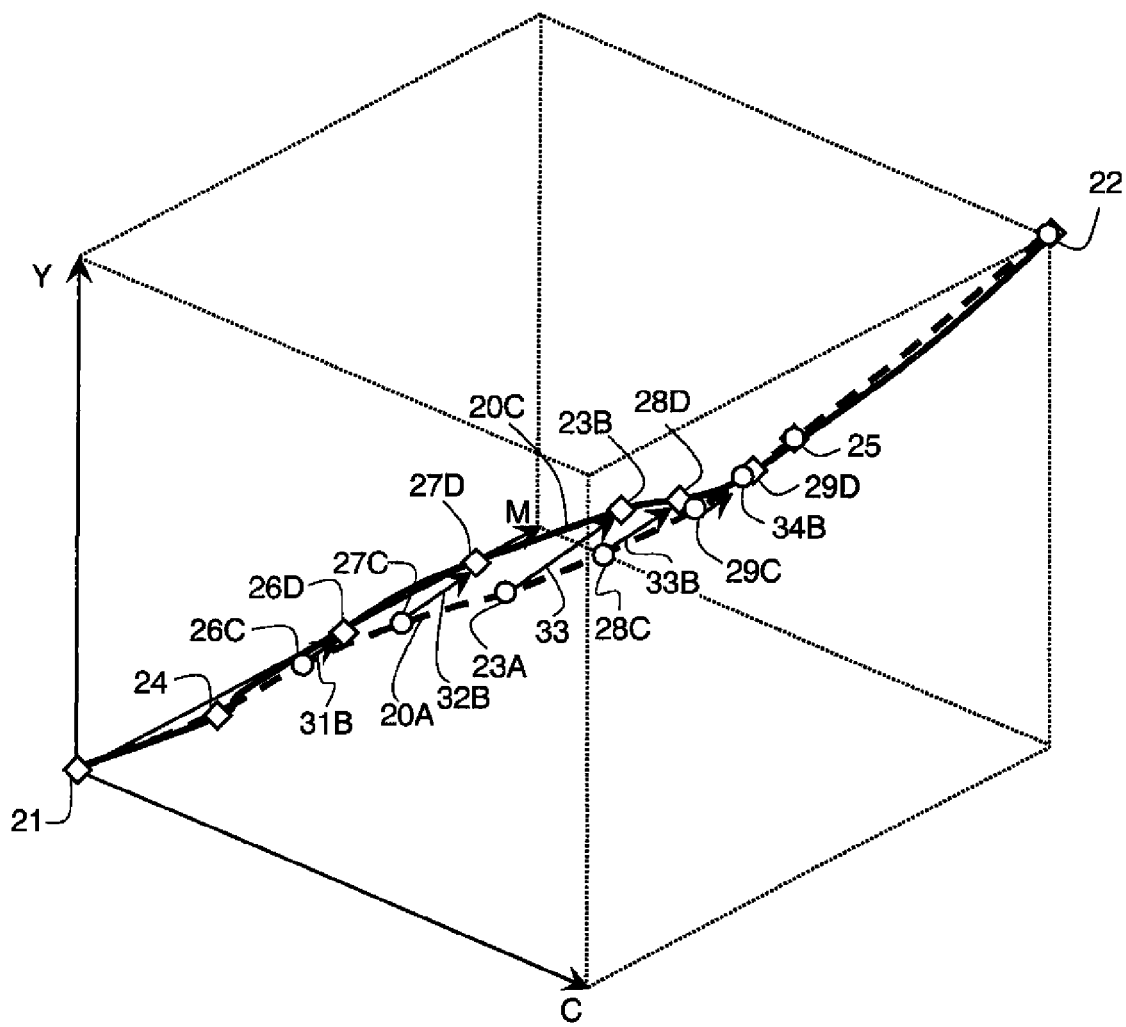

FIG. 6B is a diagram illustrating another exemplary set of adjustments made to DDC curve 20A to produce adjusted DDC curve 20C according to the present invention. In this example, which is somewhat easier to compute, DDC adjustment points 26C-29C can be selected directly, for example, by finding equidistant points on DDC curve 20A between DDC points 23A, 24A, and 25A. Further, derived DDC adjustments 31B-34B can, for example, be based on DDC adjustment 33 directly and maintain the direction of DDC adjustment 33 but vary in magnitude according to the distance between DDC adjustment points 26C-29C and 33. Adjusted DDC point 23B, which is the same in both methods, and adjusted DDC points 26D-29D can thus be computed along with adjusted DDC curve 20C in a manner similar to that described above.

Regardless of the method for deriving adjusted DDC curve 20B (or 20C), the present invention can then select a set of device coordinate values for each DDC color axis and compute a smooth one-dimensional transform adjustments for each color. Area 42 of FIG. 4 depicts such a resulting set of one-dimensional transform adjustments.

For example, cyan offset 50, magenta offset 51, and yellow offset 52 correspond to adjustment DDC point 23A and DDC adjustment 33. In particular, the "Tint in" values for offsets 50-52 correspond to the coordinates of adjustment DDC point 23A. Thus, for example, DDC point 23A has coordinates (38, 40, 35). Similarly, the "Tint out" values for offsets 50-52 correspond to the magnitude of DDC adjustment 33. Thus, for example, DDC adjustment 33 has relative coordinates (-6, 10, 5). Similarly, offsets 53-55 correspond to DDC point 24A and offsets 56-58 correspond to DDC point 25A.

Figure 7:
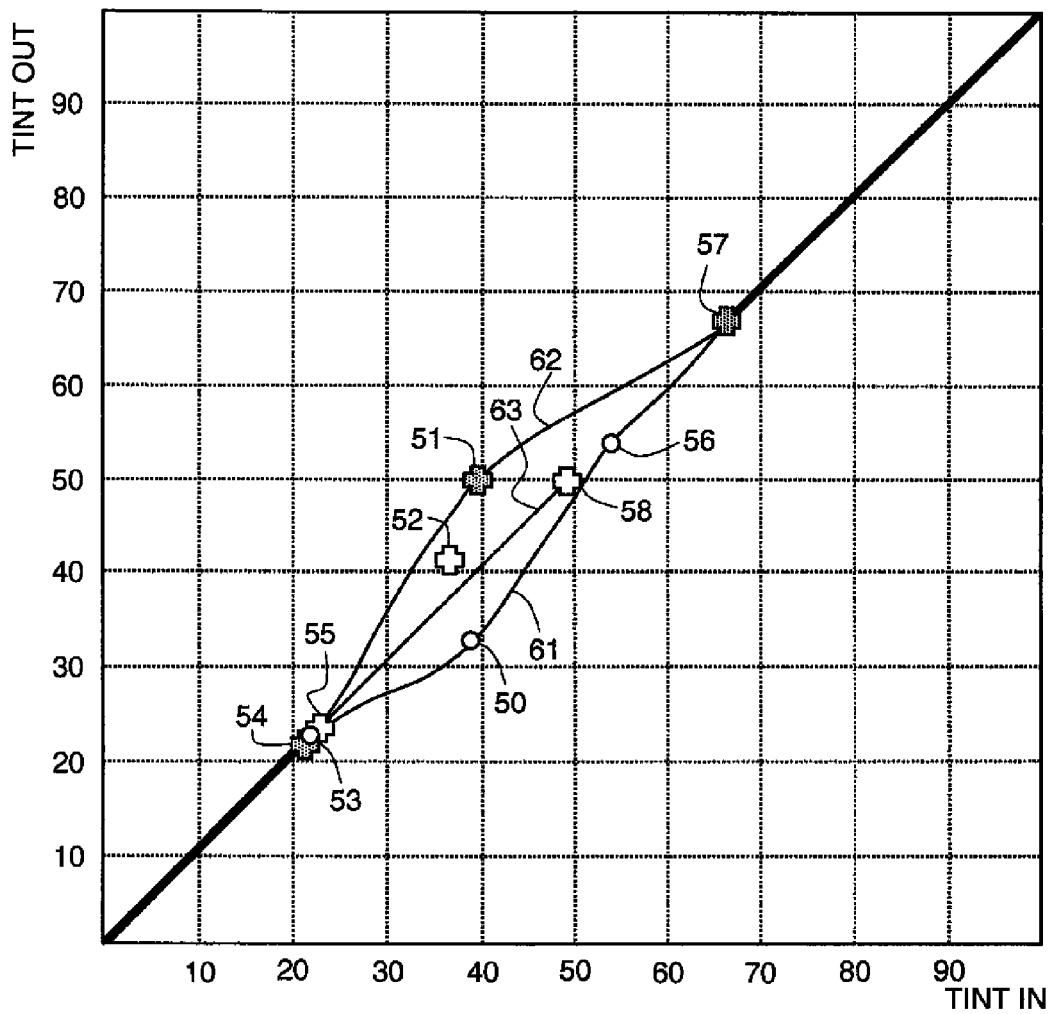
FIG. 7 is a diagram illustrating exemplary adjustments made to one-dimensional transforms based on an adjusted DDC curve according to the present invention.

FIG. 7 is a diagram illustrating exemplary adjustments made to one-dimensional transforms (cyan transform 61, magenta transform 62, and yellow transform 63) based on adjusted DDC curve 20B (or 20C) according to the present invention. The offsets 50-58, depicted in area 42, are used to create a new one-dimensional transform for each color, as shown. In the case where one-dimensional transforms already exist, the offsets can be added to the output tint values for the corresponding input tint values and then interpolating the points in between.

The above examples are particularly compelling because they involve mapping coordinates from one three-dimensional space to another, such that a nominal DIC curve has one and only one associated DDC curve. It is not uncommon for a device to have four or more process colors, such that there are a large number of possible DDC curves that can produce DIC curve.

In one embodiment, when a black process color is added, the black color is ignored in the adjustment process. In other embodiments, rules can be established to govern the relationship between black and the other process colors so that black is adjusted in a coordinated fashion with the other colors. One skilled in the art will realize that there are many prior art techniques for trading black color for combinations of cyan, magenta and yellow color.

In general, regardless of the number of process colors, rules that enable association of one N-dimensional DDC curve with one three-dimensional DIC curve can be established so that adjustment to each color's one-dimensional transform can be determined.

One-dimensional transforms, derived through the use of DIC curves, can also be used to map image data, intended for a source device, into image data for a destination device. The modified image data enables the destination device to emulate the response of the source device. Creating transforms for this purpose can be requested by providing inputs to a computer system through a user or software interface. Exemplary methods for creating transforms for this purpose are described below with reference to FIGS. 8-11.

Figure 8:
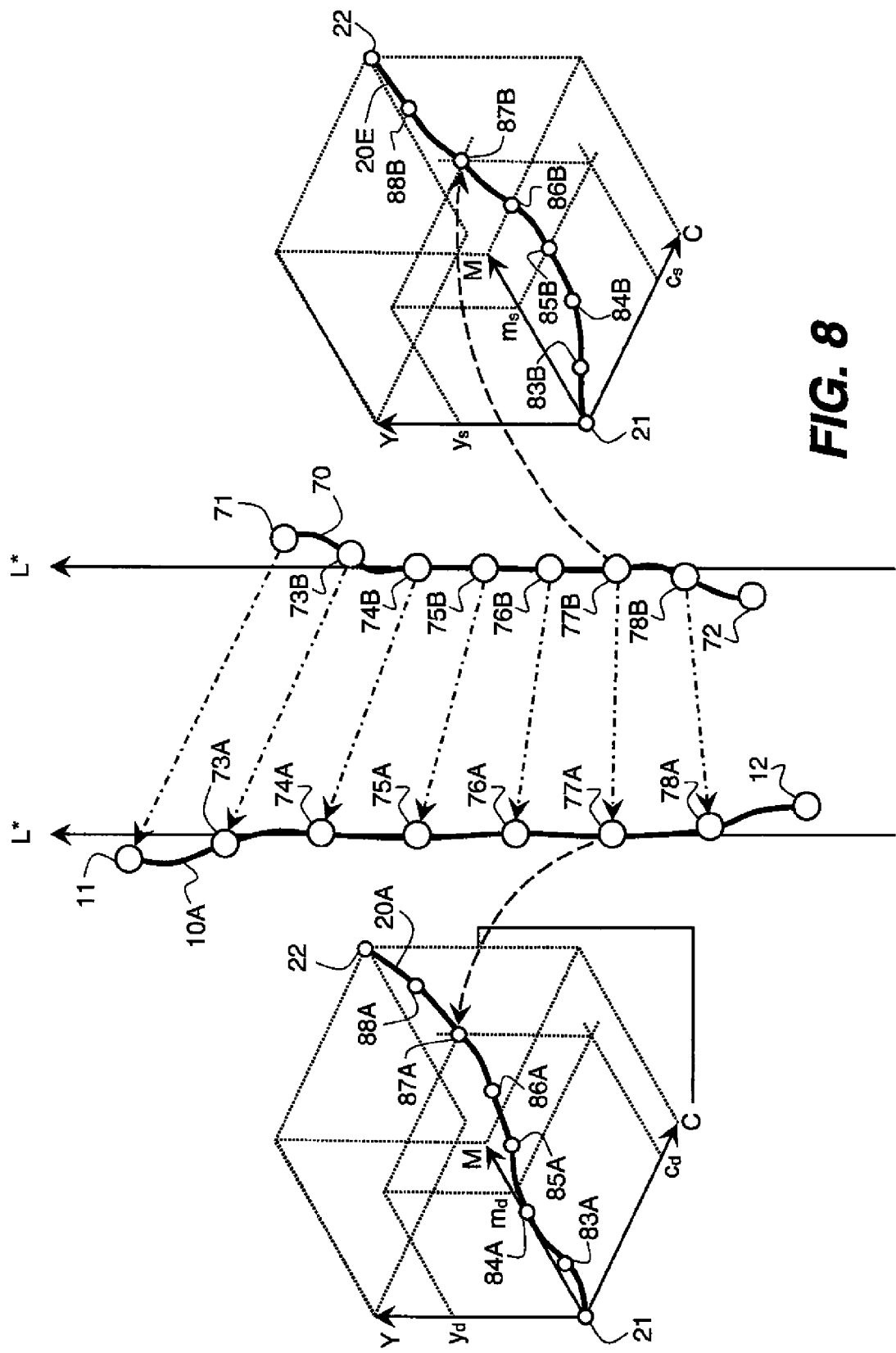
FIG. 8 is a diagram illustrating an exemplary association between source and destination process color coordinates based on DIC curves according to the present invention.

FIG. 8 is a diagram illustrating an exemplary association between source and destination process color coordinates based on DIC curves 10A and 70 according to the present invention. In a preferred embodiment, neutral DIC curves can be used for associating DDC coordinates involving process colors. To enable one-to-one mapping between DDC and DIC coordinates, process colors can be limited to three (e.g. cyan, yellow, and magenta), with other colors associated in a manner described below. Where additional process colors are to be mapped using neutral DIC curves 10A and 30, rules for consistently mapping one DIC curve to one of many possible DDC curves must be used.

In FIG. 8, neutral colors (e.g. destination DIC points 11, 12, and 73A-78A), corresponding to neutral DIC curve 10A, can be produced by a destination device for process color coordinates (e.g. DDC points 21, 22, and destination DDC points 83A-88A, respectively) corresponding to destination DDC curve 20A. Similarly, neutral colors (e.g. source DIC points 71, 72 and 73B-78B), corresponding to neutral DIC curve 70, can be produced by a source device for process colors coordinates (e.g. DDC points 21, 22, and source DDC points 83B-88B, respectively) corresponding to source DDC curve 20E.

An association can be made between source and destination DDC points, for example, by first starting with a source DIC point (e.g. source DIC point 77B) and, using a reverse model of the source device's response, finding source DDC point 87B. Next, an association can be made between source DIC point 77B and destination DIC point 77A based on a normalized DIC characteristic.

In one embodiment, this association can be made based on normalized L* values. That is, for both DIC curves 10A and 70, find corresponding DIC points (e.g. DIC points 77A and 77B) whose L* value, divided by the L* range for the associated DIC curves (e.g. DIC curve 10A and 70, respectively), match. In another embodiment, instead of matching based on normalized L* values, matching can be based on normalized Euclidian distance along the corresponding DIC curve. Another exemplary method can incorporate a model of human perception into mapping of a DIC curve (e.g. curve distance) since human perception of change is not uniform, with respect to Euclidian distance between DIC points, throughout device-independent space.

Once source and destination DIC points 77A and 77B are associated, an association between destination DIC point 77A and destination DDC point 87A can be made using a reverse model of the destination device's response. Thus, for example, DDC light point 21 (no color) and DDC dark point 22 (full color) in both source and destination DDCs can be commonly associated so that the source gamut surface maps to the destination gamut surface. Also, for example, source DDC points 83B-88B map respectively to destination DDC points 83A-88A so that mapped neutral colors have similar appearance.

Figure 9:
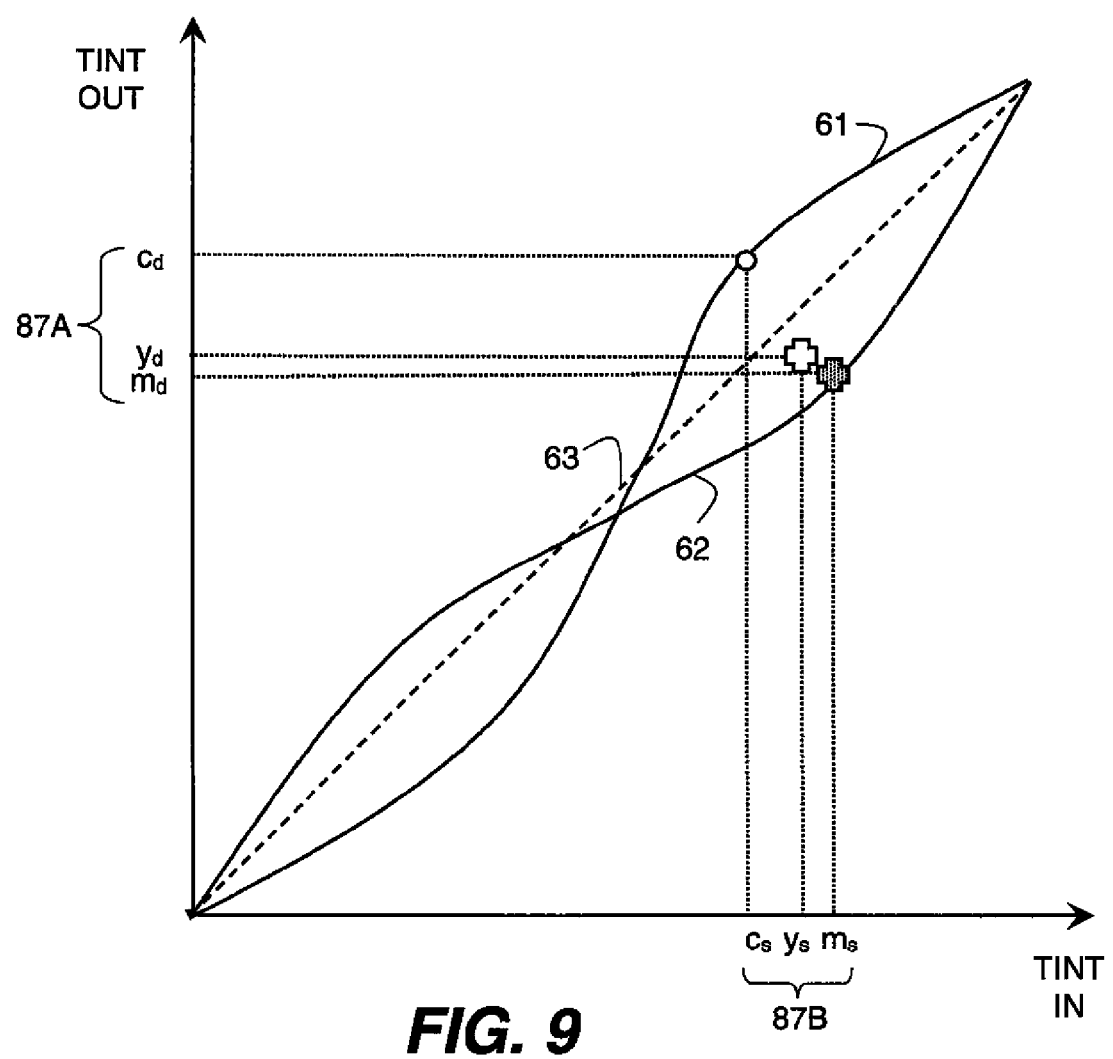
FIG. 9 is a diagram illustrating an exemplary set of one-dimensional transforms for mapping source process color coordinates to destination process color coordinates according to the present invention.

FIG. 9 is a diagram illustrating an exemplary set of one-dimensional transforms 61-63 for mapping source process color coordinates to destination process color coordinates according to the present invention. Transforms 61-63 use source coordinate values (e.g. tint in) as input to produce destination coordinate values (e.g. tint out) as output based on smoothly fitting coordinates from a number of associated DDC points. For example, source coordinates $c_s$, $y_s$, and $m_s$, for source DDC point 87B are plotted in relation to destination coordinates $c_d$, $y_d$, and $m_d$, respectively for associated destination DDC point 87A.

Figure 10:
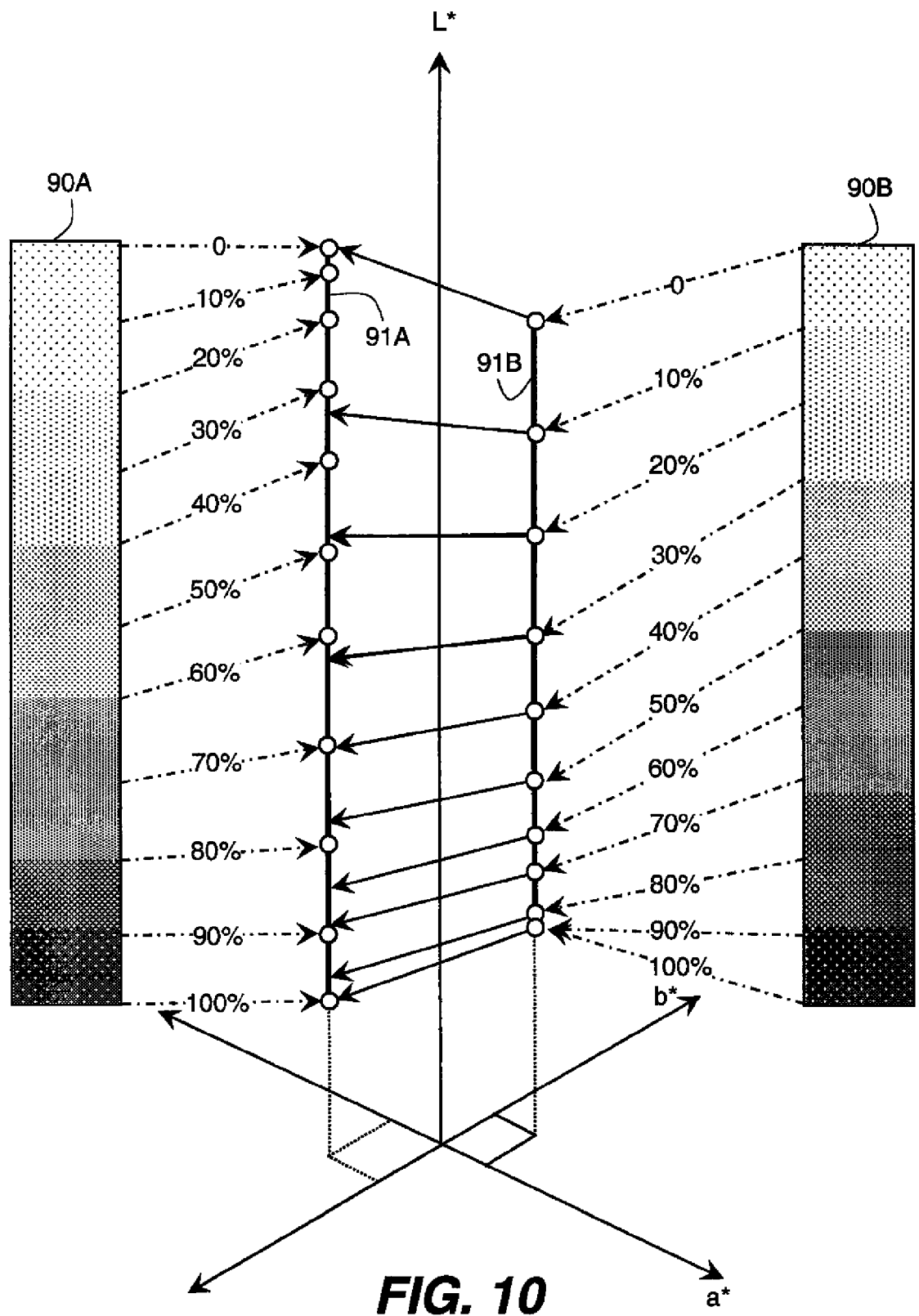
FIG. 10 is a diagram illustrating an exemplary association between source and destination DIC curves, derived from single color tone ramps, according to the present invention.

FIG. 10 is a diagram illustrating an exemplary association between source and destination DIC curves 91B and 91A, derived from single color tone ramps 90B and 90A, according to the present invention. Note that tone ramps 90A and 90B are essentially DDC curves in a one-dimensional DDC. This approach can be used, according to one embodiment, as a first step in mapping source DDC tint values to destination DDC tint values for other colors (e.g. black, other process colors, and spot colors) that are not mapped according to the methods described in FIGS. 8 and 9.

Accordingly, single color tone ramps 90A and 90B, for destination and source devices respectively, can be used in conjunction with their respective device forward models to determine DIC points on DIC curves 91A and 91B. In this black color example, the source and destination tints are depicted with slightly different color casts (i.e. different a* and b* offsets). In addition, the source device produces a narrower range of lightness (L*) values than the destination device does. Mapping of various tone values (e.g. 10% increments) to corresponding DIC points is depicted with dashed arrows.

Figure 11:
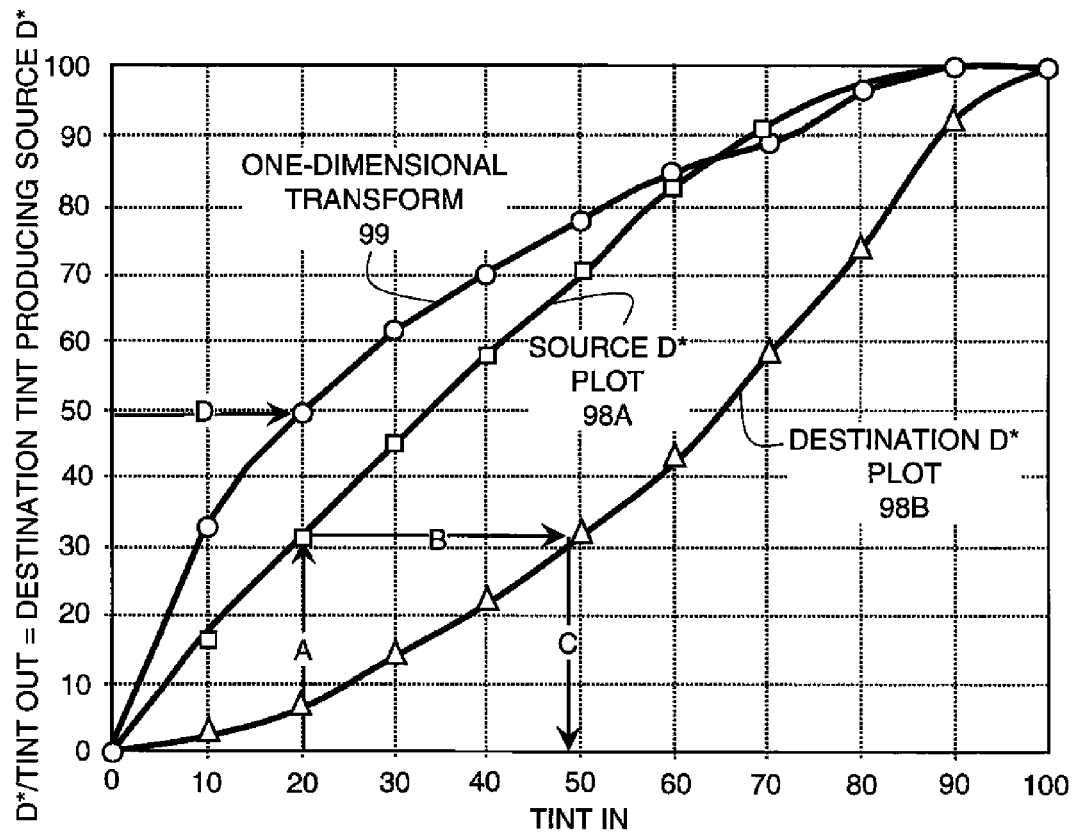
FIG. 11 is a diagram illustrating an exemplary one-dimensional transform 99C for mapping source tint values to destination tint values for a single color according to the present invention.

FIG. 11 is a diagram illustrating an exemplary one-dimensional transform 99 for mapping source tint values to destination tint values for a single color according to the present invention. The first step in determining the one-dimensional transform 99 involves creating an association between points on source and destination DIC curves 91A and 91B. Associations between selected points are depicted in FIG. 10 with solid arrows.

As described above, associations between points on similar DIC curves 91A and 91B can be made using a variety of methods. In this example, DIC points are associated as described below. First, source L* values 93 and destination L* values 95 are normalized as source D* values 94 and destination D* values 96 respectively. In general, however, any DIC attribute applicable to both DIC curves can be used as a basis for a one-to-one mapping between points on the DIC curves.

D* values, in this example, represent a degree of darkness scaled to the range of L* values for the device. In other words, D*=0 represents no tint and D*=100 full tint for the single color. Thus, the associations depicted in FIG. 10 are between points on DIC curves 91A and 91B having the same D* values. As an alternative, E* values (not shown) could be used instead of D* values. E*, for example, can represent the normalized Euclidian distance along respective DIC curves 91A and 91B.

Next, based on the association between source and destination DIC points, destination tint values producing source D* values 97 can be calculated. This can be done, for example, by plotting input tint values 92 versus destination D* values 96 (plot 98B) and source D* values 94 (plot 98A) and interpolating. Output tint values for one-dimensional transform 99 can then be found for an input tint value, for example, by first selecting a source tint value (e.g. 20% tint identified by the arrow in step A). Next, at step B, a source D* value (e.g. 31) is obtained from plot 98A. Next, at step C, a destination tint value (e.g. 49%) is obtained from plot 98B based on the D* value found in step B. Finally, at step D, the destination tint value from step C (e.g. 49%) is paired with the source tint value 92 from step A (e.g. 20%) to identify the destination tint that produces the source tint.

Embodiments of the present invention may comprise any medium which carries a set of computer-readable signals comprising instructions which, when executed by a computer processor, cause the computer processor to execute a method of the invention. Embodiments may be in any of a wide variety of forms. Embodiments may comprise, for example, physical media such as magnetic storage media including floppy diskettes, hard disk drives, optical data storage media including CD ROMs, DVDs, electronic data storage media including ROMs, flash RAM, or the like or transmission-type media such as digital or analog communication links. The instructions may optionally be compressed and/or encrypted on the medium.

The invention has been described in detail with particular reference to certain preferred embodiments thereof, but it will be understood that variations and modifications can be effected within the scope of the invention.

PARTS LIST

- 10A DIC curve
- 10B DIC curve
- 10C DIC curve
- 10D DIC curve
- 11 DIC light point
- 12 DIC dark point
- 13A mid-tone point
- 13B mid-tone point
- 13C mid-tone point
- 13D mid-tone color
- 14 quarter tone point
- 15 three-quarter tone point
- 16A adjustment
- 16B adjustment
- 16C adjustment
- 17 lightness adjustment
- 18 color cast adjustment
- 20A DDC curve
- 20B DDC curve
- 20C DDC curve
- 20E DDC curve
- 21 DDC light point
- 22 DDC dark point
- 23A DDC point
- 23B adjusted DDC point
- 24A DDC point
- 25A DDC point
- 26A DDC point
- 26B adjusted DDC point
- 26C DDC adjustment point
- 26D adjusted DDC point
- 27A DDC point
- 27B adjusted DDC point
- 27C DDC adjustment point
- 27D adjusted DDC point
- 28A DDC point
- 28B adjusted DDC point
- 28C DDC adjustment point
- 28D adjusted DDC point
- 29A DDC point
- 29B adjusted DDC point
- 29C DDC adjustment point
- 29D adjusted DDC point
- 30 neutral tone DIC curve
- 31 light point
- 31A DDC adjustment
- 31B DDC adjustment 32 dark pint
32A DDC adjustment
32B DDC adjustment
33B DDC adjustment
34B DDC adjustment
33 DDC adjustment
33A DDC adjustment
34A DDC adjustment
40 user interface
41 button
42 area
43 area
44 control
45 control
46 control
47 control
48 before patch
49 after patch
50 cyan offset
51 magenta offset
52 yellow offset
53 cyan offset
54 magenta offset
55 yellow offset
56 cyan offset
57 magenta offset
58 yellow offset
61 cyan transform
62 magenta transform
63 yellow transform
70 DIC curve
71 DIC light point
72 DIC dark point
73A destination DIC point
73B source DIC point
74A destination DIC point
74B source DIC point
75A destination DIC point
75B source DIC point
76A destination DIC point
76B source DIC point
77A destination DIC point
77B source DIC point
78A destination DIC point
78B source DIC point
83A destination DDC point
83B source DDC point
84A destination DDC point
84B source DDC point
85A destination DDC point
85B source DDC point
86A destination DDC point
86B source DDC point
87A destination DDC point
87B source DDC point
88A destination DDC point
88B source DDC point
90A source tone ramp
90B source tone ramp
91A destination DIC curve
91B source DIC curve
92 tint values
93 source L* values
94 source D* values
95 destination L* values
96 destination D* values
97 destination tint values producing source D
98A source D* plot
98B destination D* plot
99 one-dimensional transform
100 image data
101 device
102 basic tonal response
103 basic color response
105A cyan transform
105B magenta transform
105C yellow transform
105D black transform
105E spot color 1 transform
106 multi-dimensional transform
108A cyan transform
108B magenta transform
108C yellow transform
108D black transform
108E spot color 1 transform
110 image data
111 tonally corrected device
112 corrected tonal response
113 tonally corrected color response
120 image data
121 color corrected device
123 color corrected color response
130 image data

The invention claimed is:

1. A method for creating one-dimensional transforms for a device, the method comprising:
    selecting at least one device-dependent color space (DDC) color for transformation;
    determining a motive for creating one-dimensional transforms for the at least one DDC color;
    associating points from at least one device independent color space (DIC) curve and at least one DDC curve based on the selected DDC colors;
    creating at least one one-dimensional transform for the selected DDC colors based on the motive and the associated points;
    wherein determining the motive comprises determining a need for adjusting a response of the device;
    wherein selecting at least one DDC color for transformation comprises selecting at least three DDC colors;
    wherein associating points from at least one DIC curve and at least one DDC curve comprises:
    identifying a DIC curve as a basis for adjusting the device response; and
    identifying a DDC curve corresponding to the DIC curve by identifying an associated DDC point for each of a selection of points on the DIC curve using a model of an expected response for the device;
        wherein identifying the DIC curve comprises identifying a neutral DIC curve; and
        wherein creating the one-dimensional transforms for the selected DDC colors comprises:
    selecting a first adjustment point on the DIC curve;
    selecting a first adjustment vector for the adjustment point;
    determining an adjustment extent along the DIC curve surrounding the adjustment point;
    identifying a plurality of DDC adjustment vectors for a plurality of DDC adjustment points on the DDC curve based on the DIC adjustment vector, the adjustment extent along the DIC curve and a model of the expected device response; and
    creating one-dimensional transforms for the selected DDC colors based on the plurality of DDC adjustment vectors for the plurality of DDC adjustment points.

2. A method according to claim 1 wherein selecting the first adjustment vector comprises selecting a vector to modify the chromaticity of the adjustment point.

3. A method according to claim 1 wherein selecting the first adjustment vector comprises selecting a vector to modify the lightness of the adjustment point.

4. A method according to claim 1 wherein identifying the plurality of DDC adjustment vectors for the plurality of DDC adjustment points on the DDC curve comprises:
   identifying a plurality of additional DIC adjustment points along the adjustment extent;
   calculating a plurality of additional DIC adjustment vectors for the plurality of additional DIC adjustment points wherein calculating each additional adjustment vector comprises maintaining the direction of the first adjustment vector and assigning a reduced first adjustment vector magnitude based on the distance of the additional adjustment point from the first adjustment point; and
   identifying the plurality of DDC adjustment vectors for the plurality of DDC adjustment points based on the plurality of DIC adjustment points and the corresponding plurality of DIC adjustment vectors.

5. A method according to claim 4 wherein identifying a DDC adjustment vector for a DDC adjustment point based on a DIC adjustment point and a corresponding DIC adjustment vector comprises:
   identifying the DDC adjustment point based on the DIC adjustment point and a model of the expected device response;
   identifying the DDC vector endpoint based on the DIC adjustment point offset by the DIC adjustment vector and a model of the expected device response; and
   calculating the DDC adjustment vector as the difference between the DDC vector endpoint and the DDC adjustment point.

6. A method according to claim 1 wherein identifying the plurality of DDC adjustment vectors for the plurality of DDC adjustment points on the DDC curve comprises:
   identifying a first DDC adjustment vector for a first DDC adjustment point based on the first adjustment point and the first adjustment vector;
   identifying a plurality of additional DDC adjustment points in relation to the first DDC adjustment point; and
   calculating a plurality of additional DDC adjustment vectors for the plurality of additional DDC adjustment points wherein calculating each additional adjustment vector comprises maintaining the direction of the first DDC adjustment vector and assigning a reduced first DDC adjustment vector magnitude based on the distance of the additional DDC adjustment point from the first DDC adjustment point.

7. A method according to claim 1 wherein creating one-dimensional transforms for the selected DDC colors comprises creating a plurality of transform tuples for each selected color wherein each transform tuple comprises an input tint and an output tint for the selected color and wherein each transform tuple is based on a DDC adjustment point and a corresponding DDC adjustment vector.

8. A method according to claim 7 wherein creating the transform tuple for the selected color comprises:
   selecting the coordinate for the selected color from the DDC adjustment point as input tint; and
   calculating the output tint as the input tint plus the value for the selected color from the DDC adjustment vector.

9. A method for creating one-dimensional transforms for a device, the method comprising:
   selecting at least one device-dependent color space (DDC) color for transformation;
   determining a motive for creating one-dimensional transforms for the at least one DDC color;
   associating points from at least one device independent color space (DIC) curve and at least one DDC curve based on the selected DDC colors;
   creating at least one one-dimensional transform for the selected DDC colors based on the motive and the associated points;
   wherein determining the motive comprises determining a need for a destination device to emulate the response of a source device;
   wherein selecting at least one DDC color for transformation comprises selecting at least three DDC colors; and
   wherein associating points from at least one DIC curve and at least one DDC curve comprises:
   identifying neutral DIC curves corresponding to both the source and destination devices;
   associating points on the source neutral DIC curve with points on the destination neutral DIC curve based on a DIC characteristic;
   identifying source and destination DDC curves corresponding to the respective neutral DIC curves by identifying an associated DDC point for each of a selection of points on a respective DIC curve using a model of an expected response for the respective device; and
   associating points on the source DDC curve with points on the destination DDC curve based on the association between source and destination neutral DIC points and the association between DIC and DDC points for respective devices.

10. A method according to claim 9 wherein associating points on the source neutral DIC curve with points on the destination neutral DIC curve based on the DIC characteristic comprises one of:
    associating points having the same normalized $L^*$ values;
    associating points having the same normalized distance along respective DIC curves; and
    associating points by incorporating human perception into a DIC curve mapping.

11. A method according to claim 9 wherein creating one-dimensional transforms for the selected DDC colors comprises creating a plurality of transform tuples for each selected color wherein each transform tuple comprises an input tint and an output tint for the selected color and wherein each transform tuple is based on an associated source and destination DDC point.

12. A method for creating one-dimensional transforms for a device, the method comprising:
    selecting at least one device-dependent color space (DDC) color for transformation;
    determining a motive for creating one-dimensional transforms for the at least one DDC color;
    associating points from at least one device independent color space (DIC) curve and at least one DDC curve based on the selected DDC colors;
    creating at least one one-dimensional transform for the selected DDC colors based on the motive and the associated points;
    wherein determining the motive comprises determining a need for adjusting a response of the device;
    wherein selecting at least one DDC color for transformation comprises selecting at least three DDC colors;
    wherein associating points from at least one DIC curve and at least one DDC curve comprises:

identifying a DIC curve as a basis for adjusting the device response; and identifying a DDC curve corresponding to the DIC curve by identifying an associated DDC point for each of a selection of points on the DIC curve using a model of an expected response for the device;

wherein identifying the DIC curve comprises identifying a neutral DIC curve;

wherein creating the one-dimensional transforms for the selected DDC colors comprises:

selecting a first adjustment point on the DIC curve;

selecting a first adjustment vector for the adjustment point;

determining an adjustment extent along the DIC curve surrounding the adjustment point;

identifying a plurality of DDC adjustment vectors for a plurality of DDC adjustment points on the DDC curve based on the DIC adjustment vector, the adjustment extent along the DIC curve and a model of the expected device response; and creating one-dimensional transforms for the selected DDC colors based on the plurality of DDC adjustment vectors for the plurality of DDC adjustment points;

wherein creating one-dimensional transforms for the selected DDC colors comprises creating a plurality of transform tuples for each selected color wherein each transform tuple comprises an input tint and an output tint for the selected color and wherein each transform tuple is based on a DDC adjustment point and a corresponding DDC adjustment vector; and wherein creating a transform tuple for the selected color comprises:

selecting the coordinate for the selected color from the source DDC point as input tint; and selecting the coordinate for the selected color from the destination DDC point as output tint.

13. A method for creating one-dimensional transforms for a device, the method comprising:

selecting at least one device-dependent color space (DDC) color for transformation;

determining a motive for creating one-dimensional transforms for the at least one DDC color;

associating points from at least one device independent color space (DIC) curve and at least one DDC curve based on the selected DDC colors;

creating at least one one-dimensional transform for the selected DDC colors based on the motive and the associated points;

wherein determining the motive comprises determining a need for a destination device to emulate the response of a source device;

wherein selecting at least one DDC color for transformation comprises selecting only one DDC color common to both source and destination devices; and wherein creating one-dimensional transforms for the one DDC color comprises creating a plurality of transform tuples wherein each transform tuple comprises an input tint and an output tint for the one DDC color and wherein each transform tuple is based on a source input tint and the association between points on the source and destination DIC curves and the association between points on the respective DIC and DDC curves.

14. A method according to claim 13 wherein creating a transform tuple for the one DDC color comprises:

selecting the source input tint as the input tint;

identifying source DIC point associated with the source input tint;

identifying the destination DIC point associated with the source DIC point; and selecting the destination input tint associated with the destination DIC point as the output tint.

* * * * *